US 9,824,034 B1

(12) United States Patent
Zheng

(10) Patent No.: US 9,824,034 B1
(45) Date of Patent: Nov. 21, 2017

(54) PARALLEL ORDERING QUEUE USING ENCODED COMMAND TYPES

(71) Applicant: International Business Machine Corporation, Armonk, NY (US)

(72) Inventor: Jie Zheng, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/277,178

(22) Filed: Sep. 27, 2016

(51) Int. Cl.
| | |
|---|---|
| *G06F 13/16* | (2006.01) |
| *G06F 12/123* | (2016.01) |
| *G06F 13/364* | (2006.01) |
| *G06F 13/40* | (2006.01) |

(52) U.S. Cl.
CPC ........ *G06F 13/1626* (2013.01); *G06F 12/123* (2013.01); *G06F 13/364* (2013.01); *G06F 13/404* (2013.01); *G06F 2212/69* (2013.01)

(58) Field of Classification Search
CPC .. G06F 13/364; G06F 13/404; G06F 13/1626; G06F 12/123
See application file for complete search history.

(56) References Cited

U.S. PATENT DOCUMENTS

| | | | | |
|---|---|---|---|---|
| 6,065,089 A | * | 5/2000 | Hickerson | G06F 9/4825 710/266 |
| 6,910,087 B2 | | 6/2005 | Stuber et al. | |
| 8,145,805 B2 | | 3/2012 | Miller et al. | |
| 9,071,499 B2 | | 6/2015 | Talla et al. | |
| 2003/0056034 A1 | * | 3/2003 | Olds | G06F 3/0601 710/5 |
| 2008/0140724 A1 | * | 6/2008 | Flynn | G06F 1/183 |
| 2009/0307473 A1 | * | 12/2009 | Miller | G06F 9/3824 712/245 |

* cited by examiner

*Primary Examiner* — Nimesh G Patel
(74) *Attorney, Agent, or Firm* — Cantor Calburn LLP; Steven Chiu

(57) ABSTRACT

Embodiments include method, systems and computer program products for a parallel ordering queue using an encoded command type. In some embodiments, a command may be receive from a receiver of a first bus, wherein the command is to be sent to a second bus. The command may be decoded. The command may be associated with an encoded command type. The command may be placed in an ordering queue. A first entry of a second queue may be popped based on the encoded command type of the first entry of the ordering queue. The first entry of the ordering queue may be removed from the ordering queue.

20 Claims, 3 Drawing Sheets

PARALLEL ORDERING QUEUE USING ENCODED COMMAND TYPES

BACKGROUND

The present disclosure relates to methods, systems and computer program products for parallel ordering queues using encoded command types.

In a computing environment where two buses are communicated through a bridge, a master drive may be responsible for issuing read commands, and write commands and write data to the bus on one end of the bridge. A slave drive associated with the master drive for the bus on the same end of the bridge may be responsible for accepting read commands, write commands and write data, and returning read completions. Commands are received from a receiver from the bus on the other end of the bridge and are processed in the order they are received. Processing commands as they are received may result in inefficient use of resources as well as the slave drive and master drive blocking each other as they process the received commands.

SUMMARY

In accordance with an embodiment, a method for parallel ordering queues using an encoded command type is provided. The method may include receiving a command from a receiver of a first bus. The command may be send to a second bus. The command may be decoded. The command may be associated with an encoded command type. The command may be placed in an ordering queue. A first entry of the ordering queue may be processed. A determination may be made to pop a first entry of a second queue based on the encoded command type of the first entry of the ordering queue. The first entry of the ordering queue may be removed from the ordering queue.

In another embodiment, a computer program product may comprise a non-transitory storage medium readable by a processing circuit and storing instructions for execution by the processing circuit for performing a method that may include receiving a command from a receiver of a first bus, wherein the command is to be sent to a second bus. A command may be decoded. The command may be associated with an encoded command type. The command may be placed in an ordering queue. A first entry of the ordering queue may be processed. A determination may be made to pop a first entry of a second queue based on the encoded command type of the first entry of the ordering queue. The first entry of the ordering queue may be removed from the ordering queue.

In another embodiment, a system may include a processor in communication with one or more types of memory. The processor may be configured to receive a command from a receiver of a first bus, wherein the command is to be sent to a second bus. The command may be decoded. The command may be associated with an encoded command type. The command may be placed in an ordering queue. A first entry of the ordering queue may be processed. A determination may be made to pop a first entry of a second queue based on the encoded command type of the first entry of the ordering queue. The first entry of the ordering queue may be removed from the ordering queue.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for parallel ordering queues using encoded command types are provided. This disclosure is directed to a parallel ordering queue that uses a 2-bit encoded command type to enable ordering of commands as they are received and dependent on the command type. Once a command that can be passed is identified at the head of the ordering queue (e.g., first entry of the ordering queue), the encoded command may be popped from the ordering queue and the corresponding command counter may be incremented. The counters may be used to determine when commands are popped from their respective queues and transmitted to the master or slave drives for servicing.

A parallel ordering queue is utilized to store 2-bit encoded command type. When a command is received from a receiver of a bus, the command may be decoded and stored into its corresponding command or data queue. This command may also be encoded using a 2-bit encoder and stored into an ordering queue at the same time.

The first entry of the ordering queue is always being processed. If the first entry is a write command, the write command that is at the first entry of write command queue is serviced and the first entry of the ordering queue is removed after the write command has finished. This ensures that no commands can pass the write command that is in front of them.

If the entry is a read command or a completion command, the entry is removed from the ordering queue. The corresponding ordered command counter is incremented by 1. The number of read commands or read completion commands indicated by their corresponding ordered command counter may be serviced independently by the master and slave drives, respectively. The ordered command counter decrements by 1 each time its corresponding command is completed. This ensures that completion commands and/or read commands are not blocking write commands that are behind them and read commands or completion commands do not block each other.

Popping the read command or read completion command immediately from the ordering queue ensures that next write command can be serviced at the earliest possible and the read commands or read completion command does not block the write command.

The proposed solution works for any processor local bus (PLB) communications for any bus that has ordering requirements. The systems and methods described herein may also be configured to include a configurable bit that can be set to disable the ordering for any particular command type that can be popped immediately at the head of the ordering queue. For example, an ordered completion counter may be set to "1" to indicate that there is at least one completion has been ordered always, and if so, there is no need to wait after the encoded completion command to go through the ordering queue and set the ordered completion counter before it can be serviced.

Figure 1:
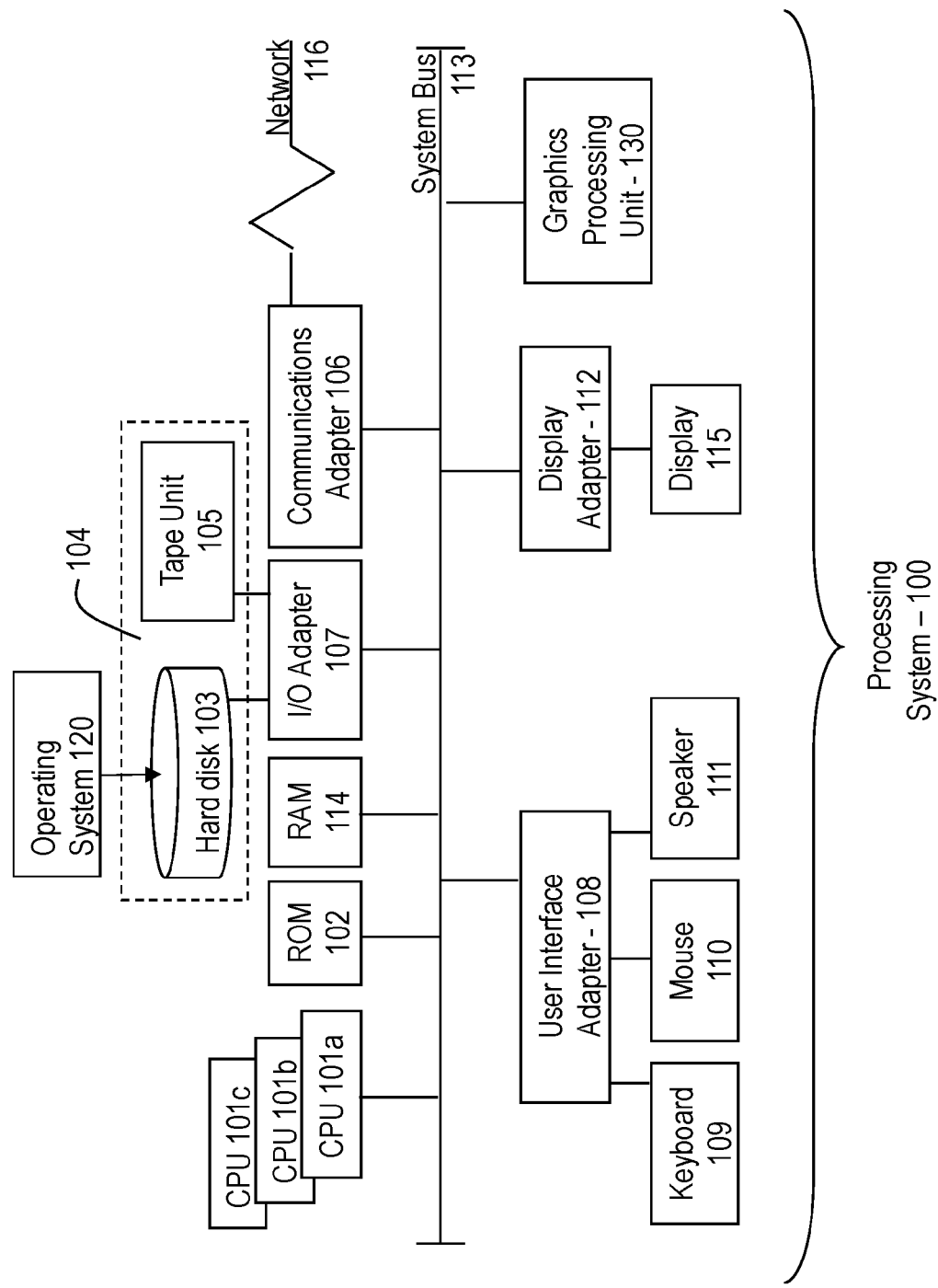
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
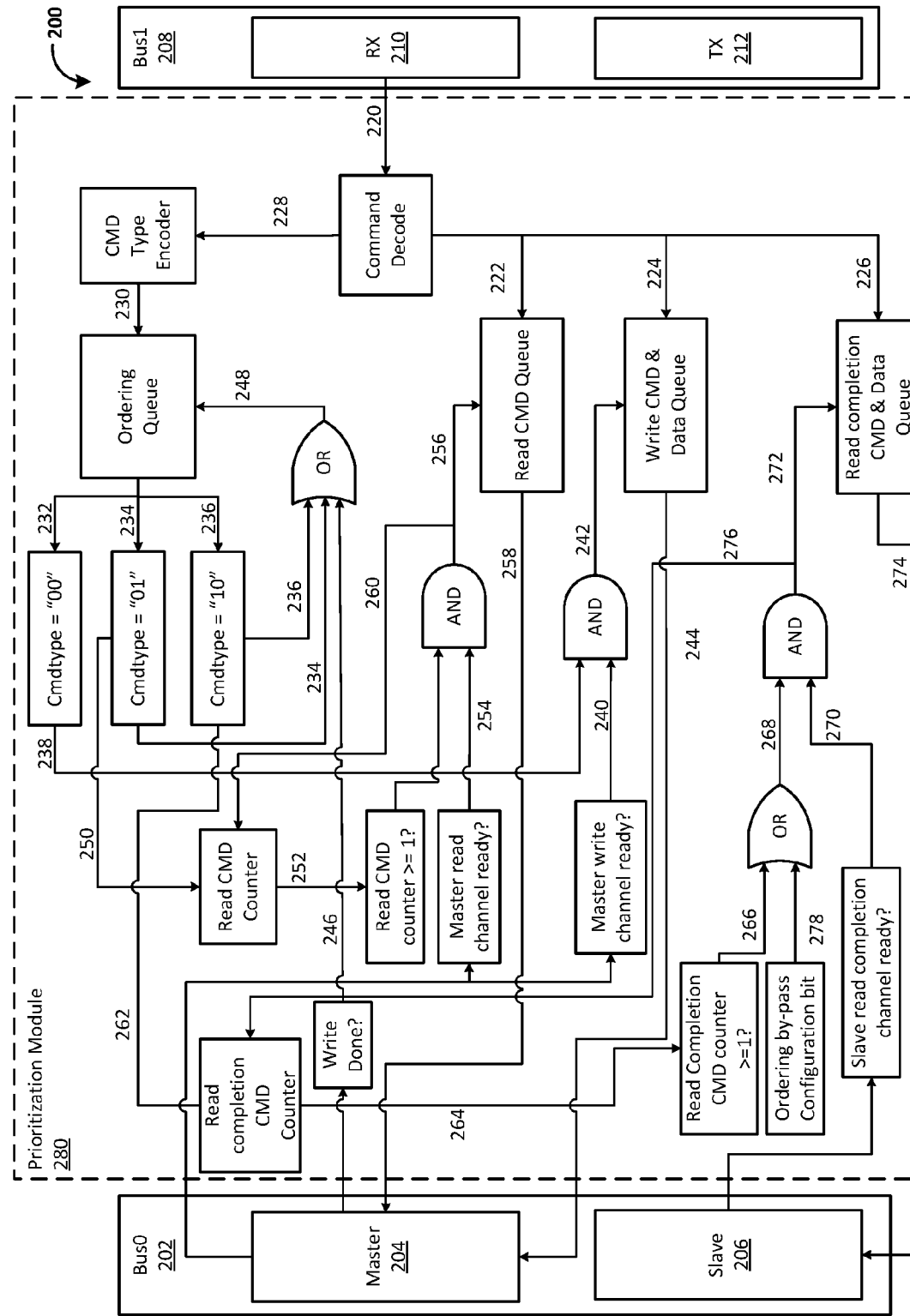
FIG. 2 are block diagrams illustrating computing systems in accordance with exemplary embodiments.

Referring now to FIG. 2, a block diagram illustrating a computing system 200 in accordance with exemplary embodiments is depicted. In a bridge system, as depicted in FIG. 2, a master drive 204 may be responsible for executing read commands, and write commands and write data, received from Bus1 208. The slave drive may be responsible for accepting the read commands, write commands and write data from Bus1 208 and forwarding them to Bus0 202, and also returning the read completions received from Bus1 208 to Bus0 202. The read completions received from BUS1 208 may need to be ordered with the write commands received from BUS1 208. The slave drive 206 may return the read completion after all of its previous write commands have been pushed into Bus0 by the master drive 204. The write commands received from Bus1 208 may need to be prioritized over the read completions and read commands received from Bus1 208. The read commands received from Bus1 208 may not be prioritized over the previously received write commands from Bus1 208. The read commands and the read completions received from Bus1 208 may be allowed to pass each other. The parallel ordering queue in conjunction with commands counters may be designed to comply with all the ordering rules described herein. The command counters may represent the number of its corresponding commands that were sorted and ready to be serviced.

The system 200 may include Bus1 208 and Bus0 202. Bus1 208 may include a receiver 210 and a transmitter 212. Bus0 202 may include a master drive 204 and a slave drive 206. The system 200 may also include a prioritization module 280, responsible for processing and prioritizing the commands as they are received.

At step 220, commands may be received by a command decode module from a receiver 210 of bus1 208. Each command may be decoded and pushed into its corresponding command queue. For example, at step 222, if the command is a read command, the command may be placed in the read command queue (e.g., Read CMD queue). At step 224, if the command is a write command, the command and corresponding data may be placed in the write command and data queue (e.g., Write CMD & data queue). At step 226, if the command is a read completion command, the command and corresponding data may be placed in the read completion command queue (e.g., Read completion CMD & data queue).

At the same or near same time, at step 228, the command may be transmitted to the CMD type encoder to be encoded. In some embodiments, the encoding may be a two-bit command type encoding. For example, "00" may represent a write command, "01" may represent a read command, and "10" may represent a read completion command. At step 230, the encoded command type may be pushed into a 2-bits wide ordering queue. The ordering queue may be a first-in-first-out queue, where the head of the queue is constantly being processed.

For example, if the head of the ordering queue is determined to be a write command (e.g., cmdtype="00"), such as in step 232, the prioritization module 280 may proceed to step 238. A determination may be made (e.g., step 240) to determine whether the master write channel is ready. If the master write channel is ready and the head of the ordering queue is a write command, then at step 242, the write command that sits at the head of the write CMD & data queue may be popped out of the queue and be transmitted, at step 244, to the master drive 204 for execution. The corresponding data may also be popped out of the write CMD & data queue when the master write channel is ready to accept the write data.

After the master drive 204 has pushed out the data for the write command into Bus 0 202, the master drive 204 may transmit a "write done" signal to the ordering queue at step 246. The entry at the head of the ordering queue may be removed at step 248. This may ensure that no command may pass the previous write command until the write command is completed by the master drive 204.

If the head of the ordering queue is determined to be a read command (e.g., cmdtype="01"), such as in step 234, the prioritization module 280 may proceed to step 234. At step 250, a read command counter (e.g. read CMD counter) may be incremented by one. The entry at the head of the ordering queue may be removed immediately at step 248. This may ensure that the read command does not block the next write command or the next read completion command.

After the read CMD counter has been incremented, a determination may be made at step 252 to determine whether the read command has been sorted (e.g., read CMD counter>=1). If the read command has been sorted and it has been determined that the master read channel is ready (e.g., step 254), then the read command that is at the head of the read CMD queue may be popped at step 256 and transmitted, at step 258, to the master drive 204 to be serviced. Once the read command is popped out of the read CMD queue, the read CMD counter may be decremented by one, as in step 260.

If the head of the ordering queue is determined to be a read completion command (e.g., cmdtype="10"), such as in step 236, the prioritization module may proceed to step 262. At step 262, a read completion CMD counter may be incremented. The entry at the head of the ordering queue may be removed immediately, at step 248, to ensure that the read completion command does not block the next write command or the next read command.

After the read completion CMD counter has been incremented, a determination may be made at step 264 to determine whether the read completion command has been sorted (e.g., read completion CMD counter>=1). If the read completion command has been sorted (at step 266 and 268) and it has been determined that the slave read completion channel is ready (e.g., step 270), then the read completion command that is at the head of the read completion CMD & data queue may be popped at step 272 and transmitted, at step 274, to the slave drive 206 to be serviced. The corresponding data may also be popped out of the read completion CMD & data queue when the slave read completion channel is ready to accept the completion data.

Once the read completion command is popped out of the read completion CMD & data queue, the read completion CMD counter may be decremented by one, as in step 276.

If an ordering by-pass configuration bit is set (e.g., step 278), the read completion CMD counter may become irrelevant. This option allows the slave drive to process commands independent from the ordering process provided by the prioritization module 280.

Figure 3:
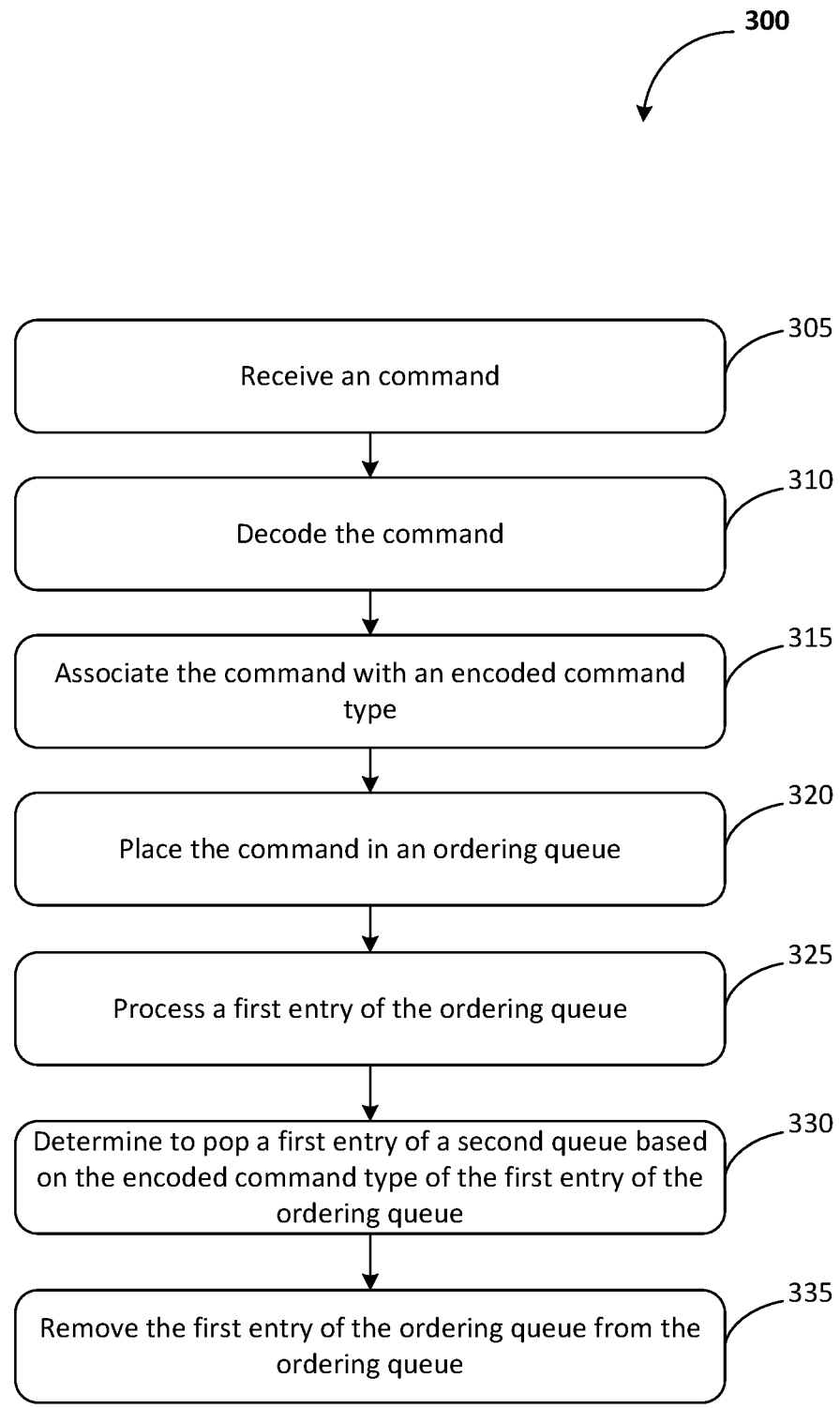
FIG. 3 is a flow diagram of a method for parallel ordering queues using encoded command types in accordance with an exemplary embodiment.

FIG. 3 is a flow diagram of a method 300 for parallel ordering queues using encoded command types in accordance with an exemplary embodiment.

At block 305, a command may be received. In some embodiments, the command may be received from a receiver 210 of a bust 208. The command may be intended to be transmitted to a second bus 202.

At block 310, the command may be decoded. In some embodiments, the command may be decoded and stored in its corresponding command or data queue.

At block 315, the command may be associated with an encoded command type. In some embodiments, the encoded command type may be a two-bit command type. In some embodiments, "00" may be indicative of a write command, "01" may be indicative of a read command, and "10" may be an indication of read completion command.

At block 320, the command may be placed in an ordering queue at the same time it is decoded and stored in its corresponding command or data queue. The ordering queue may be two-bits wide. The encoded command may be pushed to the ordering queue.

At block 325, the first entry of the ordering queue may be processed. In some embodiments, the first entry of the ordering queue may be processed to determine the encoded command type associated with the entry.

At block 330, a determination may be made to pop the first entry of a second queue based on the encoded command type of the first entry of the ordering queue.

In some embodiments, the first entry of the ordering queue may be determined to be a write command. If the command type associated with the entry of the ordering queue indicates it is a write command (e.g., "00"), a determination may be made regarding whether a master write channel is ready. If the master write channel is ready, the write command at the head of the second queue, which may be the write command and data queue, may be popped out of the queue and transmitted to master drive 204 for execution. Its corresponding data may also be popped out of the write command and data queue when the master write channel is ready to accept the write data.

In some embodiments, when the master drive 204 has pushed out all the data for the write command into Bus0 202, the master drive 204 may transmit a "write done" signal to the ordering queue. The first entry of the ordering queue indicating that the command was a writing command may be removed. This ensures that no command can pass its previous write command until the write command is completed by the master drive 204.

In some embodiments, the command type of the first entry of the ordering queue may indicate a read command. A read command counter may be incremented. The first entry at the head of the ordering queue may be removed immediately from the ordering queue to ensure that the read command does not block the next write command or next read completion command.

The master read channel may be checked to determine whether it is ready to receive a read command for execution. If the master read channel is ready, a determination may be made to determine whether at least one command is sorted in the read command queue, based on the read command counter. When the master read channel is ready and the read command counter indicates at least one command is sorted, the read command that is sitting at the head of the read command queue is popped out of the queue and transmitted to the master drive 204 for execution. In response to the read command being popped out of the read command queue, the read command counter is decremented.

In some embodiments, the command type of the first entry of the ordering queue may indicate a read completion command. Upon determining that the command type of the first entry of the ordering queue indicates read completion, a read completion command counter may be incremented. A determination may be made whether a slave read completion channel associated with the slave drive 206 is ready. A determination is also made to see whether at least one command is sorted in the read completion command queue using the read completion command counter. If the slave read completion channel is ready and at least one command is sorted in the read completion command queue, the first entry of the read command queue may be popped off the queue and transmitted to the slave drive 206 for execution. The corresponding data may be popped out of the read completion command and data queue when the slave read completion drive is ready to accept the read completion data. In response to the read completion command being popped out of the read command queue, the read completion command counter is decremented.

In some embodiments, an ordering by-pass configuration bit may be set. If the ordering by-pass configuration bit is set, the read completion command counter may become irrelevant. This option allows a system to have an independent slave channel process for its read completion without having to wait for the ordering process.

At block 335, the first entry of the ordering queue may be removed from the ordering queue upon the command being transmitted to the different queues for servicing, as discussed above.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for parallel ordering queues using encoded command types, the method comprising:
   receiving a command from a receiver of a first bus, wherein the command is to be sent to a second bus;
   decoding the command;
   associating the command with an encoded command type;
   placing the command in an ordering queue;
   processing a first entry of the ordering queue;
   determining to pop a first entry of a second queue based on the encoded command type of the first entry of the ordering queue, wherein determining comprises incrementing a read command counter and determining that a master read channel is ready; and
   removing the first entry of the ordering queue from the ordering queue.

2. The computer-implemented method of claim 1, wherein the encoded command type is a two-bit command type.

3. The computer-implemented method of claim 1, wherein the second queue is a write command and data queue and the method further comprises:
   determining that a master write channel is ready; and
   transmitting the first entry of the second queue to a master drive of the second bus for execution.

4. The computer-implemented method of claim 3, further comprising:
   receiving an indication that the master drive has completed writing data from the first entry of the second queue; and
   removing the first entry of the ordering queue from the ordering queue based on the indication.

5. The computer-implemented method of claim 1, wherein the second queue is a read command queue and the method further comprises:
   determining that at least one command is sorted in the second queue using the read command counter;
   transmitting the first entry of the second queue to a master drive of the second bus for execution; and
   decrementing the read command counter.

6. The computer-implemented method of claim 1, wherein the second queue is a read completion command and data queue and the method further comprises:
   incrementing a read completion command counter;
   determining that a slave read completion channel is ready;
   determining that at least one command is sorted in the second queue using the read completion command counter;
   transmitting the first entry of the second queue to a slave drive of the second bus for execution; and
   decrementing the read completion command counter.

7. The computer-implemented method of claim 1, wherein the second queue is a read completion command and data queue and the method further comprises:
   determining an ordering by-pass configuration bit is set; and
   determining that a slave read completion channel is ready; and
   transmitting the first entry of the second queue to a slave drive of the second bus for execution.

8. A computer program product comprising a storage medium readable by a processing circuit and storing instructions for execution by the processing circuit for performing a method comprising:
   receiving a command from a receiver of a first bus, wherein the command is to be sent to a second bus;
   decoding the command;
   associating the command with an encoded command type;
   placing the command in an ordering queue;
   processing a first entry of the ordering queue;
   determining to pop a first entry of a second queue based on the encoded command type of the first entry of the ordering queue, wherein determining comprises incrementing a read command counter and determining that a master read channel is ready; and
   removing the first entry of the ordering queue from the ordering queue.

9. The computer program product of claim 8, wherein the encoded command type is a two-bit command type.

10. The computer program product of claim 8, wherein the second queue is a write command and data queue and the method further comprises:
    determining that a master write channel is ready; and
    transmitting the first entry of the second queue to a master drive of the second bus for execution.

11. The computer program product of claim 10, further comprising:
    receiving an indication that the master drive has completed writing data from the first entry of the second queue; and
    removing the first entry of the ordering queue from the ordering queue based on the indication.

12. The computer program product of claim 8, wherein the second queue is a read command queue and the method further comprises:
    determining that at least one command is sorted in the second queue using the read command counter;
    transmitting the first entry of the second queue to a master drive of the second bus for execution; and
    decrementing the read command counter.

13. The computer program product of claim 8, wherein the second queue is a read completion command and data queue and the method further comprises:
    incrementing a read completion command counter;
    determining that a slave read completion channel is ready;
    determining that at least one command is sorted in the second queue using the read completion command counter;
    transmitting the first entry from the second queue to a slave drive of the second bus for execution; and
    decrementing the read completion command counter.

14. The computer program product of claim 8, wherein the second queue is a read completion command and data queue and the method further comprises:
    determining an ordering by-pass configuration bit is set; and
    determining that a slave read completion channel is ready; and
    transmitting the first entry from the second queue to a slave drive of the second bus for execution.

15. A system, comprising:
    a processor in communication with one or more types of memory, the processor configured to:
    receive a command from a receiver of a first bus, wherein the command is to be sent to a second bus;

decode the command;
associate the command with an encoded command type;
place the command in an ordering queue;
process a first entry of the ordering queue;
determine to pop a first entry of a second queue based on the encoded command type of the first entry of the ordering queue, wherein determining comprises incrementing a read command counter and determining that a master read channel is ready; and
remove the first entry of the ordering queue from the ordering queue.

16. The system of claim 15, wherein the second queue is a write command and data queue and the processor is further configured to:
determine that a master write channel is ready; and
transmit the first entry of the second queue to a master drive of the second bus for execution.

17. The system of claim 16, wherein the processor if further configured to:
receive an indication that the master drive has completed writing data from the first entry of the second queue; and
remove the entry from the ordering queue based on the indication.

18. The system of claim 15, wherein the second queue is a read command queue and the processor is further configured to:
increment a read command counter;
determine that a master read channel is ready;
determine that at least one command is sorted in the second queue using the read command counter;
transmit the first entry from the second queue to a master drive of the second bus for execution; and
decrement the read command counter.

19. The system of claim 15, wherein the second queue is a read completion command and data queue and the processor if further configured to:
determine that at least one command is sorted in the second queue using the read completion command counter;
transmit the first entry of the second queue to a slave drive of the second bus for execution; and
decrement the read completion command counter.

20. The system of claim 15, wherein the second queue is a read completion command and data queue and the processor if further configured to:
determine an ordering by-pass configuration bit is set; and
determine that a slave read completion channel is ready; and
transmit the first entry of the second queue to a slave drive of the second bus for execution.

* * * * *